United States Patent [19]

Tobias et al.

[11] Patent Number: 5,493,811
[45] Date of Patent: Feb. 27, 1996

[54] PLANT WATERING METHOD AND APPARATUS

[76] Inventors: Michael E. Tobias; Samuel Tobias, both of 22 Quail Run, Warren, N.J. 07059

[21] Appl. No.: 199,332

[22] Filed: Feb. 22, 1994

[51] Int. Cl.$^6$ .......................... A01G 25/00; A01G 29/00
[52] U.S. Cl. .................................. 47/79; 47/48.5
[58] Field of Search ...................... 128/DIG. 6, DIG. 13; 601/257, 262; 47/48.5 G, 79 C, 48.5 C

[56] References Cited

U.S. PATENT DOCUMENTS

| | | | |
|---|---|---|---|
| 3,437,243 | 4/1969 | Farnsworth | 604/257 |
| 4,047,687 | 9/1977 | Turner | 47/67 |
| 4,060,934 | 12/1977 | Skaggs | 47/79 C |
| 5,235,780 | 8/1993 | Colbert | 47/79 C |
| 5,318,520 | 6/1994 | Nakao | 604/257 |

FOREIGN PATENT DOCUMENTS

| | | | |
|---|---|---|---|
| 5603/27 | of 1927 | Australia | 47/48.5 G |
| 2658163 | 8/1981 | France | 47/48.5 G |
| 2657496 | 8/1991 | France | 47/48.5 G |
| 832983 | 4/1960 | United Kingdom | 47/48.5 G |
| 05578 | 6/1989 | WIPO | 47/48.5 G |

*Primary Examiner*—Henry E. Raduazo
*Attorney, Agent, or Firm*—Selitto & Associates

[57] ABSTRACT

An apparatus and method are disclosed which operate to automatically deliver liquid to a plant growing medium in a pot from a receptacle positioned above the plant growing medium. The liquid flows from the receptacle under the influence of gravity and is supplied to the plant growing medium at predetermined drip rate, which may be manually adjusted.

3 Claims, 2 Drawing Sheets

FIG. 2
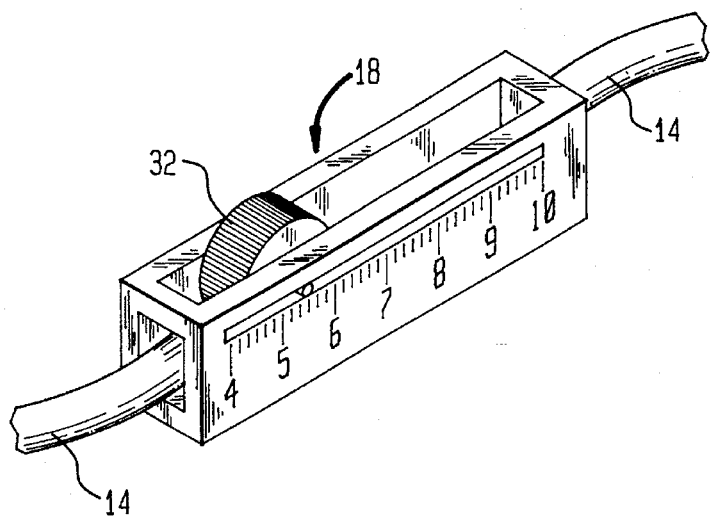
FIG. 3
| DIAMETER | SETTING | | APPROX. TIME A FULL SUPPLY OF WATER WILL LAST | MAX VACATION TIME |
|---|---|---|---|---|
| | SETTING NUMBER | APPROX. DROPS PER MINUTE | | |
| 4" | 4 | 1 DROP IN 6 MIN | 30 DAYS | 35 DAYS |
| 5" | 5 | 1 DROP IN 5 MIN | 27 DAYS | 32 DAYS |
| 6" | 6 | 1 DROP IN 3 MIN | 20 DAYS | 25 DAYS |
| 7" | 7 | 1 DROP IN 2 1/2 MIN | 14 DAYS | 19 DAYS |
| 8" | 8 | 1 DROP IN 2 MIN | 11 DAYS | 16 DAYS |
| 9" | 9 | 1 DROP IN 1 1/2 MIN | 9 DAYS | 14 DAYS |
| 10" | 10 | 1 DROP PER MIN | 7 DAYS | 12 DAYS |
FIG. 4
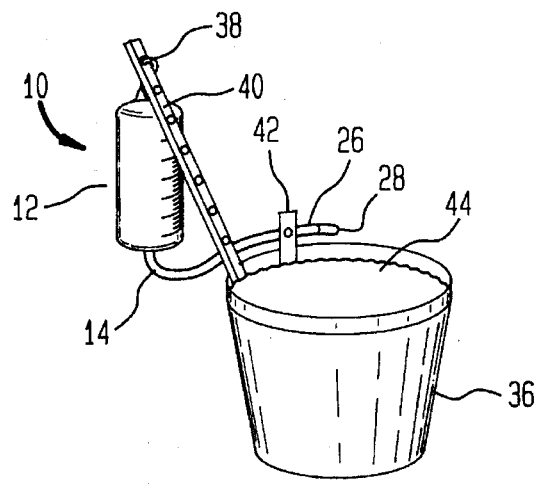

PLANT WATERING METHOD AND APPARATUS

FIELD OF THE INVENTION

The present invention relates to watering methods and apparatus, and, more particularly, to an automatic watering method and apparatus for house plants and the like.

BACKGROUND OF THE INVENTION

Plants usually need to be watered or otherwise supplied with liquid nutrition at least once a week. When an individual leaves his or her home or business for a long period of time, arrangements need to be made to care for the plants. This necessitates the inconvenience and cost of hiring help and compromising the individual's privacy.

Plant watering apparatus and methods have been developed in the past (see, for instance, U.S. Pat. Nos. 3,912,165, 4,557,071, 3,293,799 and 4,393,622). However, they are not specifically designed for easy, convenient and economical use because of their complex construction (see, for instance, U.S. Pat. Nos. 4,741,125 and 4,315,599). Some of them, for example, utilize expensive electrical components (see, for instance, U.S. Pat. Nos. 4,937,972 and 4,934,096). Others are not easily adaptable to an existing plant container (see, for instance, U.S. Pat. No. 5,097,626).

SUMMARY OF THE INVENTION

The problems and shortcomings of the prior art devices discussed above are overcome in accordance with the present invention, which is specifically designed to automatically deliver liquid to a plant growing medium in a pot using a new and improved apparatus and unique method. Both the apparatus and the method operate to dispense liquid at a predetermined drip rate onto a plant growing medium from a receptacle suspended above the plant growing medium, whereby a gravitational flow occurs as liquid travels from the receptacle to the plant growing medium. The predetermined drip rate may be adjusted manually so that a user can selectively choose one of a plurality of different drip rates.

BRIEF DESCRIPTION OF THE DRAWINGS

For a better understanding of the present invention, reference is made to the following detailed description of one exemplary embodiment considered in conjunction with the accompanying drawings, in which:

FIG. 2 is an enlarged perspective view of a metering device employed by the plant watering apparatus of FIG. 1;

FIG. 3 is a chart which may be used in conjunction with the plant watering apparatus of FIG. 1; and FIG. 4 is a schematic illustration which shows how the plant watering apparatus of FIG. 1 can be mounted on a plant pot.

DETAILED DESCRIPTION OF THE EXEMPLARY EMBODIMENT

Figure 1:
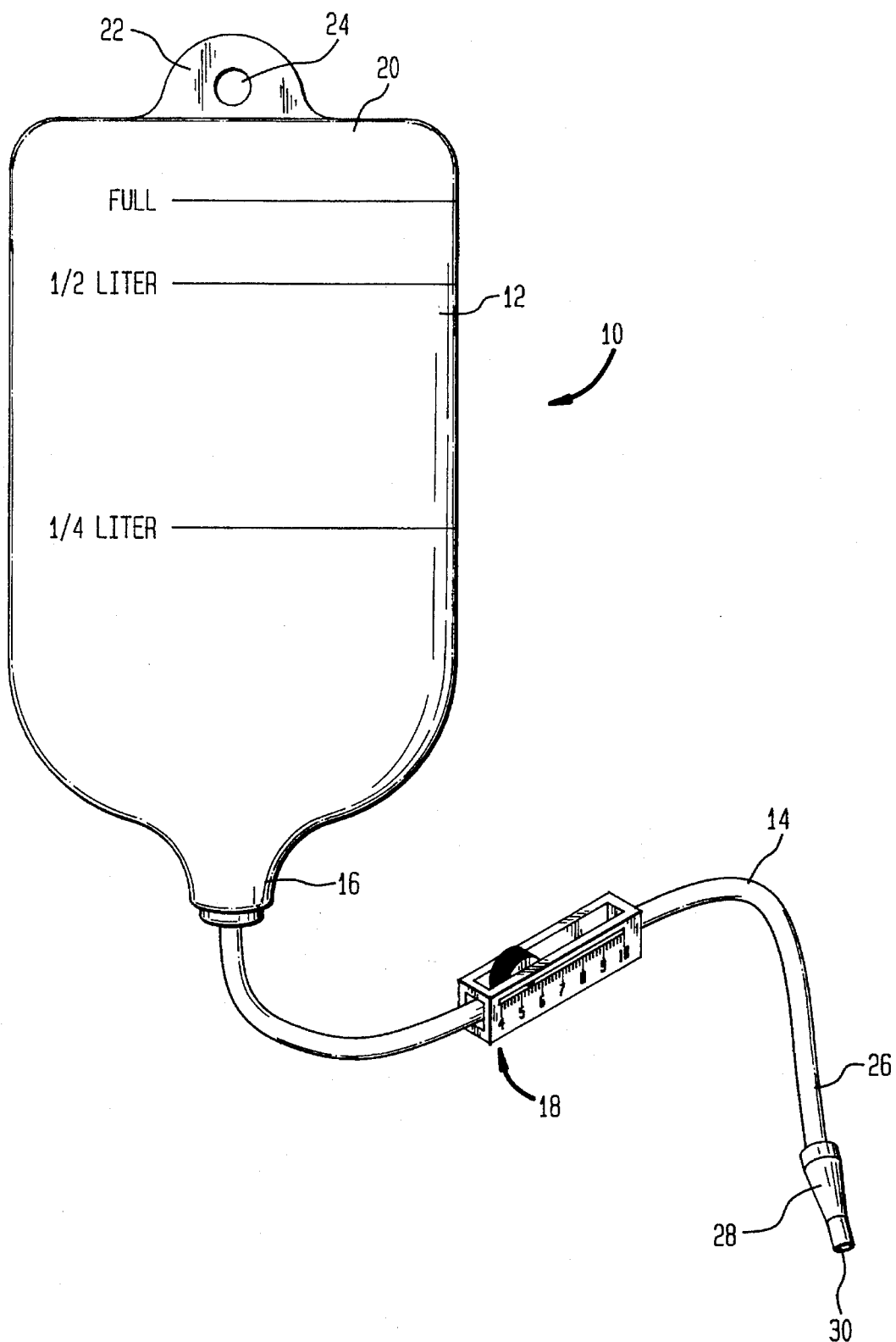
FIG. 1 is a perspective view of an exemplary embodiment of a plant watering apparatus constructed in accordance with the present invention.

As shown in FIG. 1, a watering apparatus 10 includes a bag 12 for holding water and a hose 14 connected at one end to a lower end 16 of the bag 12. An adjustable metering device 18 for regulating the rate of water flow from the bag 12 is provided on the hose 14.

The bag 12 has an upper end 20 which is provided with a tab 22 having a hole 24 therein for purposes to be discussed hereinafter. Preferably, the bag 12 is made from a flexible plastic material. Alternatively, the bag 12 may be a rigid container. As shown in FIG. 1, the bag 12 may be metered (i.e., provided with markings "Full", "½ Liter", "¼ Liter", etc.) so that the amount of water in the bag 12 can be readily determined.

The hose 14 is preferably made of flexible material and is provided with an internal, axially extending passageway (not shown) of a predetermined size. A free end 26 of the hose 14 (i.e., the end remote from bag 12) is equipped with a nozzle 28 having an opening 30 of a predetermined size so as to create drops of water of substantially equal volume (e.g., each drop of water equals 1 milliliter). Alternatively, the nozzle 28 may be omitted, in which case the free end 26 of the hose 14 would create the drops of water otherwise created by the nozzle 28.

Referring to FIG. 2, the metering device 18 is provided with a plurality of settings represented by the numbers "4", "5", "6", "7", "8", "9" and "10". The metering device 18 is designed and calibrated so that when a movable thumb wheel 32 is set at a particular setting number, water flows from the bag 12, through the hose 14 and onto a growing medium (i.e., soil in a plant pot) at a predetermined rate which corresponds to that particular setting number. For example, if it is determined that the setting number "10" corresponds to a flow rate of 0.6 milliliter per minute, then water would flow through the hose 14 and out the nozzle 28 at 0.6 milliliter per minute when the thumb wheel 32 is positioned at setting number "10". For convenience, the setting numbers can be tabulated in a table 34 (see FIG. 3) in accordance with the size (i.e., diameter) of a plant plot so that a particular setting number corresponds to a specific size pot.

Referring to FIG. 3, the table 34 can be prepared in various different of ways, depending upon a number of variables, such as the "Amount of Water Needed for a Specific Type of Plant" during a specific time period (AWNSTP), the size of the hose 14, the size of a particular pot, etc. AWNSTP for a particular plant pot size can be empirically determined. Furthermore, AWNSTP is directly proportional to the growing medium area of a plant pot (i.e., the diameter of the pot).

The table 34 shown in FIG. 3 will be described hereinafter with the following predetermined data: (1) AWNSTP for a particular type of plant in a ten-inch diameter pot is 0.6 liter per week; and (2) seventeen drops of water from the hose 14 equal 1 milliliter of water. It should be understood, however, that the following description of the table 34 is only meant to be illustrative of the present invention and is not meant to limit the scope of the present invention, which has applicability to watering plants with other predetermined data.

The calculation for the rate of water flow for a ten-inch diameter pot is as follows:

1 milliliter=17 drops;

1 liter=17,000 drops;

1 liter per week=17,000 drops/(7 days×24 hours×60 minutes)=1.69 drops per minute;

0.6 liter per week=1.69 drops per minute×0.6=1.014 drops per minute≈1 drop per minute.

Thus, a ten-inch diameter pot would require approximately 1 drop per minute.

The amount of water required for a six-inch diameter pot would be calculated as follows:

The area of a ten-inch diameter pot=$(3.14\times10^2)/4$=78 square inches;

The area of a six-inch diameter pot=$(3.14\times6^2)/4$=28 square inches;

The amount of water required for a six-inch diameter pot=1 drop per minute×(28 square inches/78 square inches)=0.36 drops per minute≈1 drop per 3 minutes.

Thus, a six-inch diameter pot would require 1 drop per 3 minutes.

Through a series of the foregoing calculations, "Drops Per Minute" (DPM) can be obtained for a number of pots of varying sizes. DPM for any size pot is:

DPM=$(17\times1000\times0.6)/(7\times24\times60\times100)\times d^2$ (where d is the pot diameter in inches).

An approximate "Time Interval" during which a full supply of water would last (TI) can be obtained in the following manner:

$$TI = \frac{\text{Full Supply of Water} \times 17,000}{DMP \times 60 \times 24}$$

If the maximum capacity of the bag 12 is 0.6 liter of water, then the TI for a six-inch diameter pot requiring 0.36 DMP is:

$$TI = \frac{0.6 \times 17000}{0.36 \times 60 \times 24} = 19.67 \text{ days}$$

Thus, the TI for a six-inch diameter pot is approximately 20 days.

Through additional calculations, TIs for pots with varying sizes can be determined. The "Maximum Vacation Time" (MVT) would be obtained by adding 5 days to TI.

As shown in FIG. 3, once all DPMs, TIs and MVTs are calculated, they can be tabulated in accordance with the sizes of plant pots and the setting numbers so that DMP, TI and MVT for a particular pot size can be readily determined.

When the watering apparatus 10 is used in conjunction with the table 34 shown in FIG. 3, the metering device 18 should be designed and calibrated so that, when the thumb wheel 32 is set at a specific setting number, water flows through the hose 14 at a rate which is equal to the corresponding DMP for the specific setting number in the table 34. Furthermore, the hose 14 and/or the nozzle 28 would be designed so as to create drops having the desired volume (e.g., 17 drops per 1 milliliter).

Referring to FIGS. 1 and 4, once the bag 12 has been filled with water, the watering apparatus 10 is suspended over a plant pot 36 by an "S" hook 38 and a pair of stakes 40, 42. More particularly, a lower leg of the "S" hook 38 is inserted through the hole 24 in the tab 22 of the bag 12, while an upper leg of the "S" hook 38 is inserted through a hole (not shown) in the stake 40, which is posted into a growing medium 44 contained in the pot 36. The free end 26 of the hose 14 is also suspended over the growing medium 44 by the stake 42, which is posted in the growing medium 44. The stake 42 is shorter than the stake 40 so that the nozzle 28 is maintained at a lower elevation than the bag 12, whereby a gravitational flow of water can be established from the bag 12 to the nozzle 28. It should be noted that the stake 40 may be provided with a plurality of holes so that the height of the bag 12 can be varied. Also, the height of the stake 42 can be varied or it can be dispensed with entirely, in which case the nozzle 28 would rest on the growing medium 44.

The metering device 18 is adjusted such that water flows through the hose 14 at a desired rate. If the table 34 shown in FIG. 3 is used in conjunction with the watering apparatus 10, the size (i.e. diameter) of the plant pot 36 is determined before setting the thumb wheel 32 of the metering device 18. The corresponding setting number for the size of the plant pot 36 is determined by using the table 34. The thumb wheel 32 is then set at the setting number provided on the metering device 18. Because the nozzle 28 is positioned below the bag 12, a gravitational flow occurs as water travels from the bag 12 to the nozzle 28.

It can be appreciated that the present invention provides a simple, convenient and economical way of watering house plants. Because the watering apparatus 10 does not require any expensive materials or electronic devices, the watering apparatus 10 can be manufactured economically. Furthermore, because the watering apparatus 10 automatically delivers a predetermined amount of water during a predetermined period of time, no human supervision is required. The use of the watering apparatus 10 is simplified further by the use of the table 34. That is, because the rate of water flow is tabulated in DPM, the rate of water flow can be readily and visually verified to ensure the proper functioning of the watering apparatus 10 when the watering apparatus 10 is in use.

It will be understood that the embodiments described herein are merely exemplary and that a person skilled in the art may make many variations and modifications without departing from the spirit and scope of the invention. For example, any conventional adjustable metering device can be employed in place of the metering device 18. Moreover, the bag 12 and the nozzle 28 may be mounted on the plant pot 36 by any suitable mechanism, such as a tripod, a bracket or an overhead wire. All such variations and modifications are intended to be included within the scope of the invention as defined in the appended claims.

We claim:

1. An apparatus for delivering liquid to a plant growing medium in a pot, said apparatus comprising holding means for holding liquid; dispensing means, positioned at a first elevation relative to the plant growing medium, for dispensing liquid at a predetermined drip rate; connecting means for connecting said dispensing means to said holding means so as to allow liquid to flow from said holding means to said dispensing means; adjusting means, mounted on said connecting means, for manually adjusting said. predetermined drip rate, whereby a user may selectively choose one of a plurality of different drip rates; and suspending means for suspending said holding means above the plant growing medium at a second elevation which is higher than said first elevation, whereby a gravitational flow occurs as liquid travels from said holding means to said dispensing means, said suspending means having a support stake, which has a pair of portions for positioning said support stake in an orientation in which one of said portions is removably embedded in the plant growing medium and another of said portions extends upwardly from the plant growing medium, said holding means releasably connected to one of a plurality of points positioned at one of a plurality of elevations along said another portion of said support stake such that said holding mean is suspended from said one of said plurality of points at said second elevation and such that said second elevation is adjustable and determined by said one of said plurality of elevations.

2. The apparatus of claim 1, wherein said another portion of said support stake extends outwardly from the plant growing medium such that said holding means is suspended substantially over an area circumscribing the plant growing medium.

3. The apparatus of claim 1, further comprising a chart which tabulates a plurality of settings, each of which corresponds to one of said plurality of different drip rates and which are positioned on said adjusting means, with said plurality of different drip rates so that a desired rate of liquid flow through said dispensing means can be readily provided by adjusting said adjusting means to one of said plurality of setting, said one of said plurality of settings providing a desired drip rate.

* * * * *